Dec. 31, 1929.  F. HOLTSCHMIT  1,741,842
MOVING STAIRCASE
Filed April 8, 1927  2 Sheets-Sheet 1

Inventor
F. Holtschmit
by
W. L. Evans
Attorney.

Dec. 31, 1929.  F. HOLTSCHMIT  1,741,842
MOVING STAIRCASE
Filed April 8, 1927   2 Sheets-Sheet 2
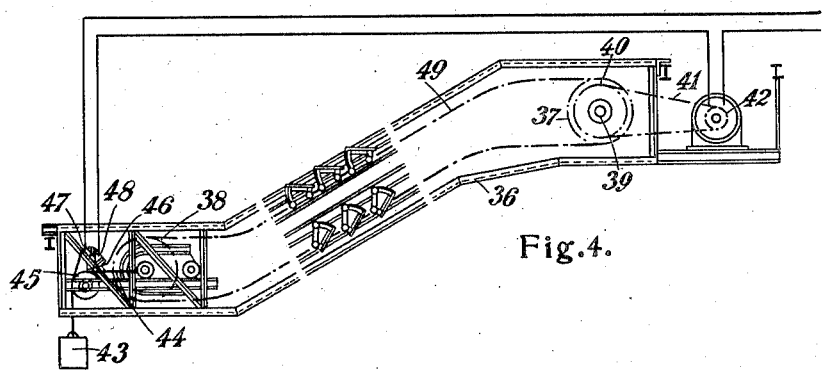
Fig.4.
Fig.5.
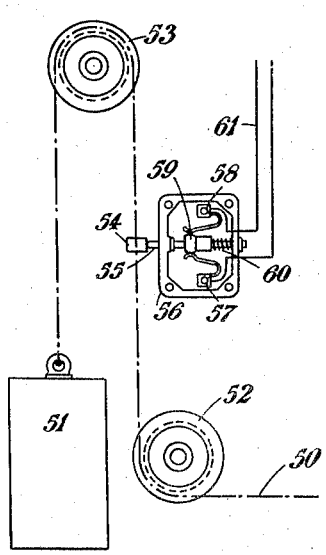
Fig.6.
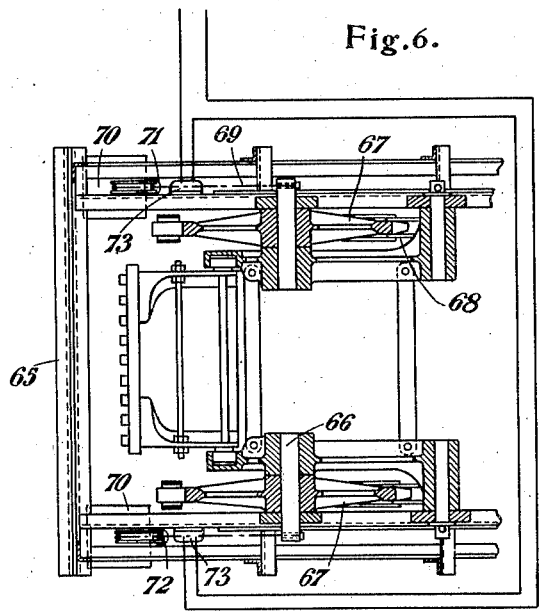
Inventor
F. Holtschmit
by
W. E. Evans
Attorney.

Patented Dec. 31, 1929

1,741,842

UNITED STATES PATENT OFFICE

FRIEDRICH HOLTSCHMIT, OF BERLIN, GERMANY

MOVING STAIRCASE

Application filed April 8, 1927, Serial No. 182,052, and in Germany April 17, 1926.

The present invention relates to moving staircases, the stairs or steps of which are carried on one or more endless moving chains.

Moving staircases of this kind are generally provided with a tensioning device for the endless chains. According to the invention, this tensioning device is connected in suitable manner to a safety device, which arrests the movement of the staircase upon a chain snapping or slackening.

The safety device according to the invention can be constructed, and controlled by the chain tensioning device, in various ways. The tensioning elements may consist of weights, springs, or hydraulic or pneumatic devices, while the safety device itself may consist of ratchet and pawl devices, circuit breaking contacts, circuit closing contacts, or the like. It is advantageous for the motor circuit to be broken by the safety device, so that the driving motor is brought to a standstill by the brake coming into action. The staircase can, however, be stopped by the use of a friction clutch, which does not transmit the drive from the driving motor when the brake comes into operation.

In the case of staircases provided with two or more driving chains for the stairs, each driving chain may be provided with a special tensioning device, so that in the case of a staircase with two driving chains the safety device is duplicated, and where there are three driving chains the safety device is triplicated, and so on.

The invention is illustrated in the accompanying diagrammatic drawings, in which:

Figure 4 shows a modification of the tensioning device in combination with the safety device.

Figure 5 illustrates, on an enlarged scale, a modified form of safety contact device in combination with the rope that is held taut between the tensioning device and the tensioning weight, and Figure 6 shows the tensioning device separate from the safety device, each for one stair chain.

Figure 1:
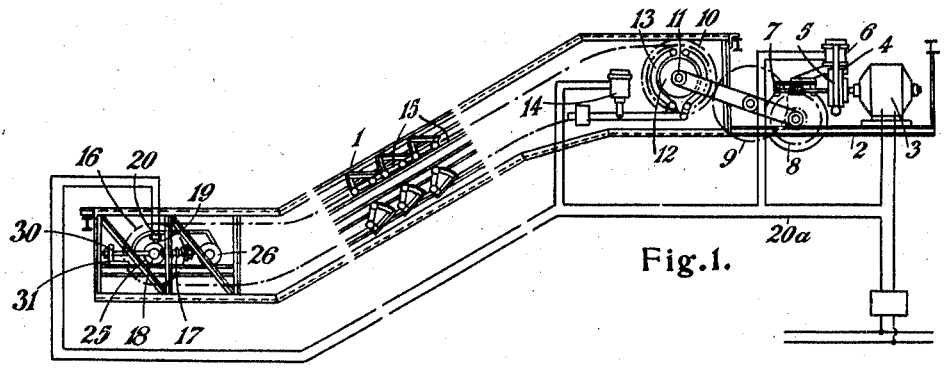
Figure 1 illustrates a staircase provided with a friction clutch between the motor and the staircase.

In Figure 1, 1 is the metal frame carrying the mechanical part of the moving staircase, and 2 is the base of the driving mechanism. 3 is the driving motor, which drives a worm shaft 7 through a friction clutch 4, which is provided on the outside as a brake drum and is surrounded by the brake band 5 that is held inoperative by the magnet 6. The shaft 7 transmits the drive to a worm wheel 8, which is provided with a gear wheel that transmits the drive to the wheel 10 through the intermediate wheel 9. The wheel 10 is mounted upon the stair driving shaft 11, which is provided with one or more sprocket wheels and receives the brake drum 12 upon the side opposite to the wheel 10. The brake drum 12 is surrounded by the brake band 13, held inoperative by the magnet 14. The stair chains 15 pass over the sprocket wheels and are carried back over the wheels 16 at the lower end of the staircase. The wheels 16 are held by adjustable tensioning springs 17 to maintain the stair chains 15 taut. The shaft of the wheels 16 is provided with a seat 32 upon which rests the pin 19 of the safety contact 20.

The safety contact 20 is in the same circuit 20ª as the magnets 6 and 14 and the motor 3. If a member of a stair chain 15 slackens or snaps for some unforeseen reason, the corresponding seat 32 is drawn out from under the pin 19 and the driving current for the motor 3 is interrupted by breakage of the circuit, and the brakes are applied, that is to say, the staircase is brought to a standstill.

Figure 3:
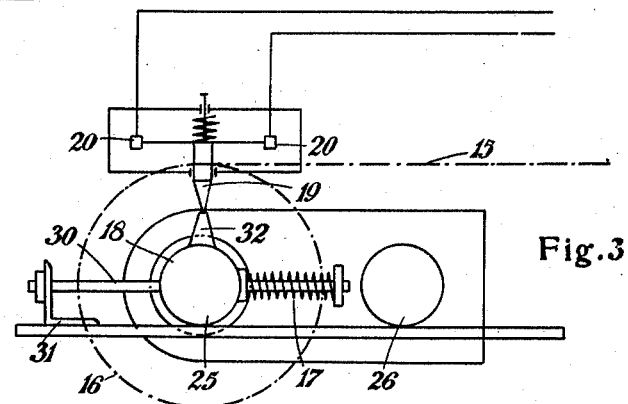
Figure 3 shows, in elevation and to an enlarged scale, the lower wheels of the staircase and the safety contact device.
Figure 2:
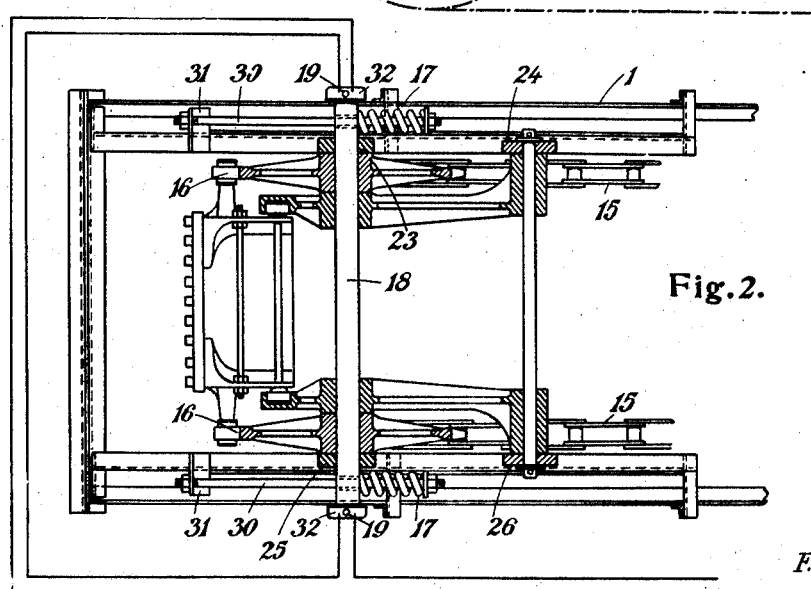
Figure 2 illustrates on an enlarged scale, the safety device in combination with the tensioning device.

The chain wheels 16 and the shaft 18 carrying them are movably connected to the frame 1 (Figures 2 and 3) in which the mechanical part of the moving staircase is mounted. The wheels on which the device for tensioning the stair chains 15 moves are numbered 23, 24, 25 and 26. The shaft 18 is held under tension by the tension rods 30 which are under the pressure of the springs 17. The tension rods 30 are supported from the frame 21 at 31.

In Figure 4 the metal frame of the moving staircase is numbered 36, the stair chain driving wheel is numbered 37 and the return wheel 38. Upon the shaft 39 which carries the driving wheel 37 is mounted the chain wheel 40 which is engaged by the driving chain 41 operated by the motor 42. The wheels 38 are held taut by a weight 43 which is connected to the rope 44 guided over the roller 45. The latter is provided with a lever 46 which at one end carries a contact 47 that rests upon the contact 48 fixed to the frame 36.

If by any chance the stair chain 49 snaps, the weight 43 operates the roller 45 to rotate it, whereby the contact 47 is moved away from the contact 48 and the current of the driving motor 42 is interrupted.

In the arrangement illustrated in Figure 5 the rope 50 which engages around the return wheel (not illustrated) is provided at its opposite end with a weight 51 and is carried over the rollers 52 and 53. 54 is an adjustable ring which is clamped at any convenient position on the rope 50 and which receives the contact pin 55 of the safety device. The latter consists of a casing 56, which carries the contacts 57 and 58. The pin 55 is provided with a bridge 59, which is under the action of the spring 60. 61 are the conductors to the motor from the safety devices.

If for any reason the stair chains snap, the rope 50 which is under the action of the weight 51 is moved from its normal position and carries with it the ring 54. The pin 55 is thus released and is moved by the spring 60. The current conducting bridge 59 of the contacts 57 and 58 is thus drawn out of contact so that the driving motor current is interrupted.

Figure 6 illustrates the case in which each stair chain is provided with a separate safety device which is actuated by a special tensioning weight. 65 is the staircase frame, 66 the shaft that carries the return wheel 67 of the stair chain 68, while 69 is the rope of the tensioning weight 70. 71 is the adjustable ring which is clamped to the rope 69 and which receives the pin 72 of the safety device 73. The method of operation is similar to that of the apparatus shown in Figure 5.

I claim:

1. In a moving staircase, the combination of a stair chain, a driving mechanism at the upper end thereof, a stair chain tensioning device at the lower end thereof, the stair chain extending between the said mechanism and the said device so that there is tension throughout the length of the stair chain, and a safety device in juxta-position with, and operated by, the stair chain tensioning device to effect stoppage of the movement of the stair chain on accidental variation in the length of the stair chain.

2. In a moving staircase, the combination of a stair chain, a driving mechanism at the upper end thereof, a stair chain tensioning device at the lower end thereof, the stair chain extending between the said mechanism and the said device so that there is tension throughout the length of the stair chain, electrical controlling apparatus applied with respect to the mechanism for causing movement of the stair chain, and a safety device in juxta-position with, and operated by, the stair chain tensioning device, comprising electric contacts which are operated by movement of a part of the stair chain tensioning device on accidental variation in the length of the stair chain to operate the electrical controlling apparatus to effect stoppage of the movement of the stair chain.

3. In a moving staircase, the combination of a stair chain, a driving mechanism at the upper end thereof, a stair chain tensioning device at the lower end thereof, the stair chain extending between the said mechanism and the said device so that there is tension throughout the length thereof, the stair chain tensioning device acting under gravity and the load and comprising a longitudinally movable stair chain engaging wheel, a weight, a member connecting the weight with the said wheel in order to extend the stair chain, electrical controlling apparatus applied to the mechanism for causing movement of the stair chain, and a safety device in juxta-position with the stair chain tensioning device and comprising contacts operated from the said member to cause the electrical controlling apparatus to effect stoppage of the movement of the stair chain on accidental variation in its length.

4. In a moving staircase, the combination of a stair chain, a driving mechanism at the upper end thereof, a stair chain tensioning device at the lower end thereof, the stair chain extending between the said mechanism and the said device so that there is tension throughout the length of the stair chain, the said stair chain tensioning device acting under gravity and the load and comprising a wheel engaging the stair chain and longitudinally movable relatively thereto, a roller adjacent the said wheel, a flexible member passing around the said roller and connected to the said wheel, a weight connected to the said flexible member and serving to extend the chain, electrical apparatus applied for the control of the movement of the stair chain, and a safety device in juxta-position to the stair chain tensioning device comprising fixed contacts and a contact arm connected to the said roller, whereby the said arm is moved from the said contacts to operate the said electrical apparatus to effect stoppage of the movement of the stair chain on accidental variation in its length.

5. In a moving staircase, the combination of a stair chain, a driving wheel engaging the said stair chain at the upper end thereof, a tensioning wheel engaging the said stair chain at the lower end thereof, a spring applied to the said tensioning wheel to extend the stair chain under tension throughout its length, means for causing movement of the stair chain in the direction of its length through the driving wheel, electrical apparatus for the control of the means for causing movement of the stair chain, fixed contacts adjacent the tensioning wheel, and co-operating contacts in fixed relation to the said tensioning wheel in order to actuate the electrical apparatus to effect stoppage of the movement of the stair chain on accidental variation in its length.

6. In a moving staircase, the combination of a stair chain, a driving wheel engaging the said stair chain at the upper end thereof, a tensioning wheel engaging the said stair chain at the lower end thereof, a spring applied to the said tensioning wheel to extend the stair chain under tension throughout its length, the said spring being laterally disposed and adjustable, means for causing movement of the stair chain in the direction of its length through the driving wheel, electrical apparatus for the control of the means for causing movement of the stair chain, fixed contacts adjacent the tensioning wheel, and co-operating contacts in fixed relation to the said tensioning wheel in order to actuate the electrical apparatus to effect stoppage of the movement of the stair chain on accidental variation in its length.

7. In a moving staircase, the combination of a stair chain, a stair chain tensioning device at the lower end thereof, a driving wheel engaging the said stair chain at the upper end thereof, the said stair chain extending between the said device and the said driving wheel so that there is tension throughout its length, a motor driving the said wheel, brakes applied to the said motor and to the said driving wheel, and a safety device in juxta-position with, and operated by, the stair chain tensioning device to apply the said brakes and stop the driving motor on accidental variation in the length of the stair chain.

8. In a moving staircase, the combination of a stair chain, a stair chain tensioning device at the lower end thereof, a driving wheel at the upper end thereof engaging the said stair chain, the said stair chain extending between the said device and the said driving wheel so that there is tension throughout the length thereof, a driving motor, a clutch through which the said driving motor transmits movement to the said driving wheel, brakes applied to the said driving wheel and to the said clutch and a safety device in juxta-position with, and operated by, the stair chain tensioning device to apply the brakes and unclutch the driving motor on accidental variation in the length of the stair chain.

9. In a moving staircase, the combination of a stair chain, a stair chain tensioning device at the lower end thereof, a driving wheel engaging the said chain at the upper end thereof, the said stair chain extending between the said device and the said driving wheel so that there is tension throughout the length thereof, a motor adapted to drive the said driving wheel, brakes applied to the said motor and to the said driving wheel, electrical apparatus applied to maintain the said brakes in inoperative position and an electrical safety device in juxta-position with, and operated by, the stair chain tensioning device to effect the operation of the said electrical apparatus to permit application of the brakes to the driving wheel and the motor to effect stoppage of the movement of the chain on accidental variation in its length.

10. In a moving staircase, a pair of stair chains, driving wheels engaging the said stair chains at the upper end thereof, a movable stair chain tensioning device at the lower end of the said chains and comprising a pair of wheels engaging the said stair chains, means for the application of a tensioning force to the said tensioning device in positions corresponding to the positions of the said stair chains to exert tension throughout the length of the said chains, means for causing movement of the stair chains in the direction of their length through the driving wheels, and safety devices applied in juxta-position to the wheels of the tensioning device and respectively operated on accidental variation in the length of the corresponding stair chain by movement of the tensioning wheel under the action of the corresponding tensioning force, the said safety device serving to effect stoppage of the movement of the stair chains.

11. In a moving staircase, the combination of a plurality of stair chains, means at the upper end thereof for causing movement of the stair chains in the direction of their length, a stair chain tensioning device applied to each of the said stair chains at the lower end thereof to maintain tension throughout the length of the said stair chain, and a safety device in respect of each chain provided in juxta-position with, and operated by, the corresponding stair chain tensioning device to effect stoppage of the movement of the stair chains on accidental variation in the length of the corresponding stair chain.

12. In a moving staircase, the combination of a plurality of stair chains, a corresponding wheel engaging each stair chain at the lower end thereof and movable in the direction of the length of the stair chain, a force applied to the said wheel to maintain tension throughout the length of the stair chain, means at the upper end of the stair chains for causing movement of the stair chains in the direction of their length, and a safety device applied in juxta-position to each of the said wheels and operated by the movement of the said wheel under the tensioning force on accidental variation in the length of the corresponding stair chain, the safety device thus serving to effect stoppage of the movement of the stair chains.

13. In a moving staircase, the combination of a stair chain, a driving mechanism at the upper end thereof, a stair chain tensioning device at the lower end thereof, the stair chain extending between the said mechanism and the said device so that there is tension throughout the length thereof, a flexible member connected to the said tensioning device, a weight supported by the said flexible member, electrical apparatus applied for the control of the movement of the stair chain, a safety member applied to the said electrical apparatus and a co-operating safety member applied to the flexible member whereby movement of the tensioning device on variation in the length of the stair chain effects separation of the said members and causes the electrical apparatus to stop the movement of the stair chain.

14. In a moving staircase, the combination of a stair chain, a driving mechanism at the upper end thereof, a stair chain tensioning device at the lower end thereof, the stair chain extending between the said mechanism and the said device so that there is tension throughout its length, a flexible member connected to the said tensioning device, a weight supported by the said flexible member, electrical apparatus applied for the control of the movement of the stair chain and a safety device applied to the said electrical apparatus and comprising a spring operated switch, a pin upon the said switch, and a narrow contact surface upon the said flexible member with which surface the pin of the switch may contact, whereby, upon movement of the tensioning device following variation in the length of the stair chain, the contact surface of the flexible member is separated from the pin of the switch to effect operation of the electrical apparatus to stop the movement of the stair chain.

FRIEDRICH HOLTSCHMIT.